United States Patent [19]
Herbert et al.

[11] 3,853,337
[45] Dec. 10, 1974

[54] FLEXIBLE ELBOW JOINT FOR PIPES

[75] Inventors: John T. Herbert; Paul E. Sullivan; Stanley P. Vitt, Jr., all of Redlands, Calif.

[73] Assignee: Lockheed Aircraft Corporation, Burbank, Calif.

[22] Filed: Feb. 25, 1974

[21] Appl. No.: 445,149

[52] U.S. Cl.................... 285/49, 285/54, 285/179, 285/234
[51] Int. Cl............................................ F16l 27/10
[58] Field of Search ....... 285/49, 54, 179, 234, 233, 285/263, 50, 51, 52, 118; 277/30; 64/11 R

[56] References Cited
UNITED STATES PATENTS

| 502,038 | 7/1893 | Herman | 285/51 |
| 2,278,479 | 4/1942 | Parker | 285/54 |
| 3,390,899 | 7/1968 | Herbert et al. | 285/118 X |
| 3,519,289 | 7/1970 | Haffer | 285/49 |
| 3,680,895 | 8/1972 | Herbert et al. | 285/223 X |
| 3,734,546 | 5/1973 | Herbert et al. | 285/49 |

Primary Examiner—Thomas F. Callaghan
Attorney, Agent, or Firm—Billy G. Corber; Keiichiro Imai

[57] ABSTRACT

A flexible pipe elbow joint with dual end flexure units providing omnidirectional flexure movement and lateral movement of the pipes joined, said joint being particularly adapted for use in submarines.

4 Claims, 2 Drawing Figures

PATENTED DEC 10 1974　　　　　　　　　　　3,853,337

FLEXIBLE ELBOW JOINT FOR PIPES

BACKGROUND OF THE INVENTION

1. Field of the Invention

This invention relates to a flexible elbow joint for pipes, and particularly to a joint adapted for use in submarines.

2. Description of the Prior Art

U.S. Pat. No. 3,734,546 describes a pipe connection also particularly adapted for use in a submarine piping system. To avoid submarine detection, the transmission of sounds to the surrounding water must be prevented or diminished. Much of the noise in a submarine piping system is generated by the motors and pumps which control the flow of various fluids in the pipelines. One of the ways to isolate these sound sources is to place them on rubber mounts or suspensions, which minimize the transmission of pump and motor noise to adjacent submarine structure. However, these rubber mounts in turn introduce variable motion into the pipelines which must be accommodated by the joints used in the system. As described in U.S. Pat. No. 3,734,546, three of the prior art connections are used in combination in the system. These connections are aligned in three different axes to accommodate the motion generated by the pumps and motors (see FIG. 1 of the patent).

U.S. Pat. No. 3,734,546 is incorporated herein by reference.

SUMMARY OF THE INVENTION

The present elbow joint supplants the prior art connections and accompanying pipes in the same submarine application. The joint comprises a 90° elbow with dual end flexure units attached. The flexure units are identical and have bell-shaped, annular housings (hereinafter also referred to as "bells") with end flanges at the bell mouth. A nipple with a flared end protrudes into the housing cavity and the nipple end is connected to the interior of the end flange by a first seal assembly and to the bell top by a second seal assembly. The first seal assembly closes the bell mouth and the second seal assembly provides for a constant diameter opening throughout the joint. The first and second seal assemblies have elastomeric elements which permit omnidirectional flexibility and also lateral movement of the nipple with respect to the housing.

The present elbow joint with the two flexure units is significantly lower in weight, more compact, and less costly than the three connections and accompanying pipes used in the prior art. At the same time, it provides the same sound isolation characteristics as the prior art connections.

Other features and advantages of the present invention will become more apparent from the following detailed description of a typical form and application of the invention taken in conjunction with the accompanying drawings.

DESCRIPTION OF THE PREFERRED EMBODIMENT

Figure 2:
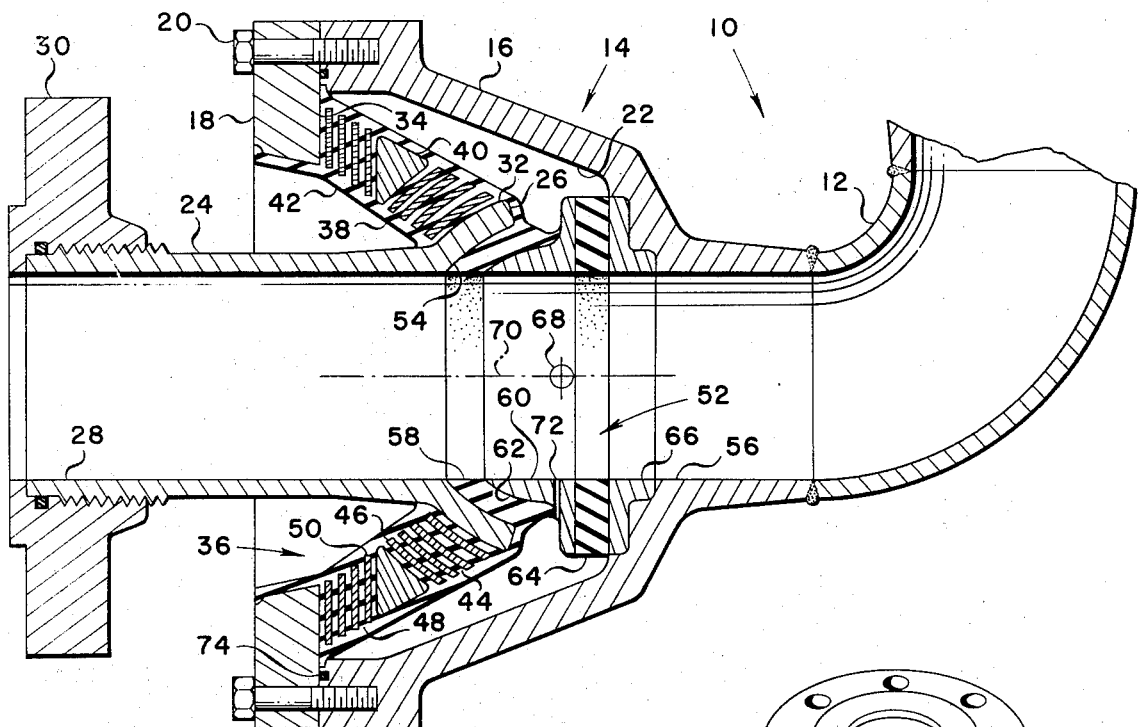
FIG. 2 is a partial elevational view of the joint, showing one of the flexure units in section.
Figure 1:
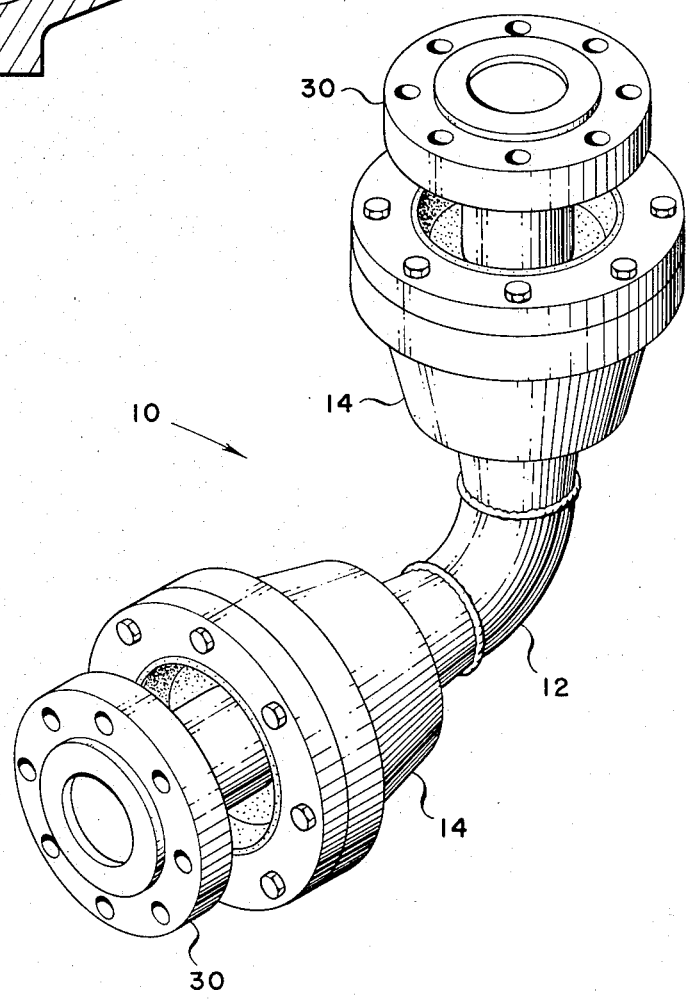
FIG. 1 is a perspective view of the present elbow joint.

FIGS. 1 and 2 show the present elbow joint 10 with a 90° elbow section 12 joined to identical flexure units 14 as by welding. Unit 14 has a bell-shaped housing 16 and an end flange 18 attached to the housing by means of fasteners 20. A nipple 24 having the same internal diameter as elbow section 12 protrudes into the cavity 22 of the housing. Nipple 24 has a spherically flared end 26 and a threaded end 28 which is connected to an attach flange 30 adapted for connection to adjoining piping.

Extending diagonally between the external surface 32 of end 26 and the internal surface 34 of flange 18 is a first seal assembly 36 which closes cavity 22. Assembly 36 consists of a first elastomeric element 38, a rigid transition element 40, and a second elastomeric element 42. The elastomeric elements are all bonded to adjacent rigid surfaces. Element 38 is comprised of alternate layers 44, 46 of an elastomer and a reinforcing material such as metal. Element 42 is also comprised of alternate layers 48, 50 of an elastomer and a reinforcing material such as metal. The elastomer may be natural rubber, nitrile, fluoroelastomer, silicone, butyl, or urethane, with nitrile being preferred. The reinforcing material may be any rigid material, such as metal or plastic. It controls the amount the elastomer will deflect when subjected to a uniform loading.

A second seal assembly 52 extends between the interior surface 54 of nipple end 26 and the housing end 56 to provide a constant interior diameter for the joint. Assembly 52 consists of a first elastomeric element 58, a rigid ball member 60 having a spherical surface 62 complementary to end surface 54, a second elastomeric element 64 and a rigid ring member 66 resting against a recessed portion of housing end 56, as shown. Element 58 is bonded to end surface 54 and to ball surface 62. Element 64 is interposed between ball member 60 and ring member 66, as shown, and is bonded to these members.

An opening 72, or a number of such openings, is provided in ball member 60 to permit fluid communication between the interior of the joint and the closed-off portion of the cavity. This puts the first seal assembly in compression and avoids subjecting elastomeric elements 58, 64 to a pressure differential. An appropriate O-ring seal arrangement 74 is provided between the housing and the end flange 18 to prevent fluid leakage.

Although the seal assemblies 36, 52 have been described above as discrete assemblies, they together with nipple 24 and end flange 18 may be fabricated as an integral unit; that is, all of the elastomeric elements may be bonded to the rigid members in an appropriate mold. The integral unit is then placed into the housing and secured in place, as shown.

To provide omnidirectional joint flexibility, the first elastomeric element 38 of the first seal assembly 36 and the first elastomeric element 58 of the second seal assembly 52 are in the form of spherical segments which have a common center of rotation 68 in the central axis 70 of the joint. This geometry permits the nipple to flex or swivel in all directions with respect to the center of rotation. The angle of flexure with respect to axis 70 may be as much as 10° for a 4 inches inside diameter joint.

Lateral movement of the nipple, or a translation of a portion of axis 70, is provided by the second elastomeric elements 42, 64 which are positioned substantially at right angles to axis 70. This lateral movement may be about ½ inch for a 4 inch inside diameter joint.

This combination of swivel and lateral movements provided by the present elbow joint will accommodate any kind of motion produced by a pump placed on elastomeric mounts as shown in FIG. 1 of U.S. Pat. No. 3,734,546. With the prior art connections, it was necessary to use three of them and align each in different axes in order to achieve the same result. The present joint is thus lighter in weight, more compact, and less costly than the prior art piping system. At the same time, it provides the same sound isolation characteristics as the prior art connections.

Other variations and modifications of the present invention will be obvious to those skilled in the art and it is intended to cover in the appended claims all such modifications and equivalents as fall within the true spirit and scope of the invention.

We claim:

1. A flexible elbow joint for pipes comprising:
   a 90° elbow subtended by identical flexure units, each unit comprising:
   an annular housing with a central cavity and a centrally perforated end flange;
   a nipple partially submerged in said cavity;
   a spherically flared end on the submerged portion of the nipple;
   a first annular, elastomeric seal assembly being disposed in said cavity and extending between the nipple end and the housing end flange and closing said cavity;
   said first seal assembly being comprised of a first reinforced elastomeric element bonded to the exterior surface of the nipple end, a second reinforced elastomeric element bonded to the interior surface of the end flange, and an annular, rigid transition element between said first and sscond elastomeric elements, said transition element being bonded to said elastomeric elements;
   a second annular, elastomeric seal assembly being disposed interiorly of said nipple end and bridging said nipple and said housing to provide a constant inside diameter for said flexure unit;
   said second seal assembly being comprised of a first ring member resting against the housing, a ball member having a spherical surface complementary to the interior surface of the nipple end, a first elastomeric element bonded to said surfaces of the nipple and said ball member, and a second elastomeric element bonded to the ball member and the ring member;
   said ball member having an opening to provide for fluid communication between the joint interior and the closed portion of the housing cavity;
   said first elastomeric elements of the first and second seal assemblies having a common center of rotation in the central axis of the joint to provide omnidirectional flexure movement of said nipple with respect to said housing;
   and said second elastomeric elements of the first and second seal assemblies being configured to provide for lateral movement of the nipple with respect to said housing.

2. A joint according to claim 1, wherein the first elastomeric element of the first seal assembly comprises a spherical segment with alternate spherical layers of an elastomer and a metal.

3. A joint according to claim 1, wherein the second elastomeric element of the first seal assembly has alternate layers of an elastomer and a metal, said layers being substantially perpendicular to the central axis of the joint.

4. A joint according to claim 1, wherein the second elastomeric element of the second seal assembly is substantially perpendicular to the central axis of the joint.

* * * * *